United States Patent
Adams et al.

(10) Patent No.: US 9,780,412 B2
(45) Date of Patent: Oct. 3, 2017

(54) ELECTRODE MATERIALS FOR RECHARGEABLE ZINC CELLS AND BATTERIES PRODUCED THEREFROM

(71) Applicant: Brian D. Adams, Mitchell (CA)

(72) Inventors: Brian D. Adams, Mitchell (CA); Dipan Kundu, Kitchener (CA)

(*) Notice: Subject to any disclaimer, the term of this patent is extended or adjusted under 35 U.S.C. 154(b) by 0 days.

(21) Appl. No.: 15/461,849

(22) Filed: Mar. 17, 2017

(65) Prior Publication Data

US 2017/0207492 A1      Jul. 20, 2017

Related U.S. Application Data

(63) Continuation of application No. PCT/CA2016/050613, filed on May 31, 2016.

(60) Provisional application No. 62/230,502, filed on Jun. 8, 2015.

(51) Int. Cl.
| | |
|---|---|
| *H01M 4/66* | (2006.01) |
| *H01M 4/62* | (2006.01) |
| *H01M 4/485* | (2010.01) |
| *H01M 10/36* | (2010.01) |

(52) U.S. Cl.
CPC ........... *H01M 10/36* (2013.01); *H01M 4/485* (2013.01); *H01M 4/623* (2013.01); *H01M 4/625* (2013.01); *H01M 4/661* (2013.01); *H01M 4/663* (2013.01); *H01M 2300/0002* (2013.01)

(58) Field of Classification Search
CPC ........ H01M 10/36; H01M 4/50; H01M 4/244; H01M 4/485; H01M 4/66; H01M 4/62
See application file for complete search history.

(56) References Cited

U.S. PATENT DOCUMENTS

| | | |
|---|---|---|
| 5,336,572 A | 8/1994 | Koksbang |
| 8,663,844 B2 | 3/2014 | Kang et al. |
| 2013/0157138 A1 | 6/2013 | Mettan et al. |
| | (Continued) | |

FOREIGN PATENT DOCUMENTS

| | | |
|---|---|---|
| CN | 102110858 | 6/2011 |
| WO | 2013112660 | 8/2013 |

OTHER PUBLICATIONS

"Manganese vanadium oxides as cathodes for lithium batteries", Heai-Ku Park, Solid State Ionics, 176, p. 307-312, 2005.*

(Continued)

*Primary Examiner* — Kenneth Douyette
(74) *Attorney, Agent, or Firm* — Bereskin & Parr LLP

(57) ABSTRACT

The present disclosure discloses a rechargeable Zn battery based on layered/tunnelled structure vanadium/molybdenum oxides, with/without the presence of neutral/cationic/anionic species and/or water molecules inserted into the interlayers/tunnels, of nano/microparticle morphology as robust materials for high rate and long term reversible $Zn^{2+}$ ion intercalation storage at the positive electrode, that are coupled with a metallic Zn negative electrode, and an aqueous electrolyte. The positive electrode may include electronically conducting additives and one or more binders along with the $Zn^{2+}$ intercalation material: the negative electrode is Zn metal in any form; the aqueous electrolyte is of pH 1 to 9 and contains a soluble zinc salt in a concentration range from 0.01 to 10 molar.

16 Claims, 14 Drawing Sheets

(56) References Cited

U.S. PATENT DOCUMENTS

2014/0050970 A1* 2/2014 Li .......................... H01M 4/26
429/163

OTHER PUBLICATIONS

"Structure and properties of layered manganese-vanadium oxide as a cathode material for lithium secondary batteries", Lu et al., Electrochemistry Communications 6, p. 672-677, 2004.*

Le et al., "Intercalation of Polyvalent Cations into V2O5 Aerogels", Chemistry of Materials, 1998, pp. 682-684, vol. 10 (3).

Jiahong et al., "AC Impedance Study of the Aqueous Zn/V2O5 Secondary Battery", Acta Physicochimica Sinica, 2000, pp. 454-458; vol. 16, No. 5.

Giorgetti et al., "Identification of an unconventional zinc coordination site in anhydrous ZnxV2O5 aerogels from x-ray absorption", 1999, pp. 2257-2264, vol. 11(8).

Zhang et al., "Hydrothermal synthesis and characterization of a series of novel zinc vanadium oxides as cathode materials", Materials Research Society Symposium Proceedings, Materials for Electrochemical Energy Storage and Conversion II—Batteries, Capacitors and Fuel Cells, 1998, pp. 367-372, vol. 496.

Xu et al., "Reversible Insertion Properties of Zinc Ion into Manganese Dioxide and Its Application for Energy Storage", Electrochemical and Solid-State Letters, 2009, pp. A61-A65, vol. 12(4).

International Search Report and Written Opinion for PCT/CA2016/050613 dated Sep. 21, 2016.

Joint Center for Energy Storage Research, downloaded from: https://www.jcesr.org/research/multivalent-intercalation/, Retrieved on Jul. 19, 2017.

Levi et al., "A review on the problems of the solid state ions diffusion in cathodes for rechargeable mg batteries." Journal of Electroceramics, 2009, 22(1-3), 13-19.

Rong et al., "Materials Design Rules for Multivalent Ion Mobility in Intercalation Structures" Chemistry of Materials, 2015, 27(17), 6016-6021.

Xu et al., Supporting Information for "Energetic Zinc Ion Chemistry: The Rechargeable Zinc Ion Battery" Angewandte Chemie, 2012, 51, 933-935.

Paulsen et al., "Layered Li—Mn-Oxide with the O2 Structure: A Cathode Material for Li-Ion Cells Which Does not Convert to Spinel" Journal of The Electrochemical Society, 1999, 146(10), 3560-3565.

* cited by examiner

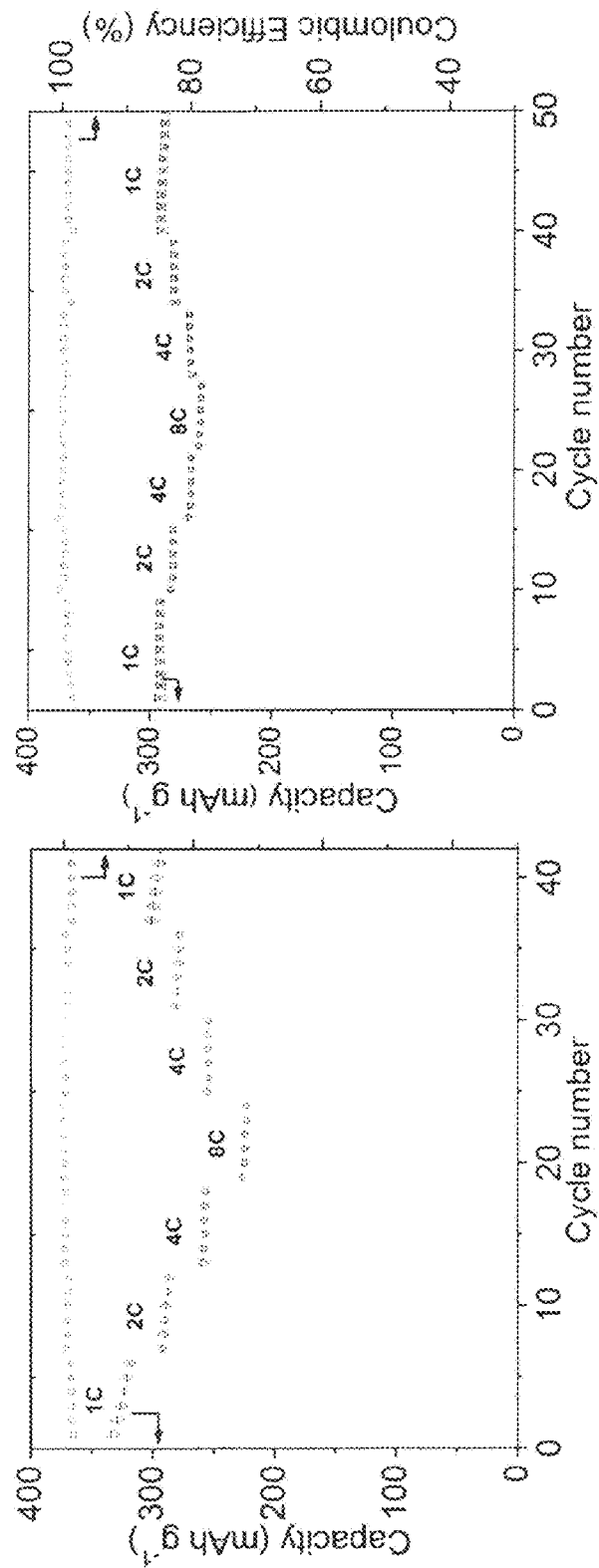

ELECTRODE MATERIALS FOR RECHARGEABLE ZINC CELLS AND BATTERIES PRODUCED THEREFROM

FIELD

This disclosure relates generally to batteries, and, more specifically to zinc ion batteries involving zinc intercalation positive electrode materials, zinc metal based negative electrodes in any form, and an aqueous electrolyte containing zinc salt and batteries using these positive electrode materials.

BACKGROUND

Given the looming concerns of climate change, sustainable energy resources such as solar and wind have entered the global spotlight, triggering the search for reliable, low cost electrochemical energy storage. Among the various options, lithium ion batteries are currently the most attractive candidates due to their high energy density, and foothold in the marketplace. However, many factors (cost, safety, and lifetime) will likely limit their large scale applications, and dictate against their use in stationary grid storage where low cost and durability are more of a concern than weight. What is needed is a high energy density battery that is rechargeable, cheap, safe, and easy to manufacture and dispose of or recycle. Aqueous batteries (water based electrolytes) are therefore attracting tremendous attention. Their high conductivity (up to 1 Siemens (S) $cm^{-1}$) compared to the non-aqueous electrolytes (0.001 to 0.01 S $cm^{-1}$) also favour high rate capabilities suitable for emerging applications.

The use of metallic negative electrodes is a means to achieve high energy density and ease of battery assembly (hence lower cost). There is a trade-off between the reduction potential of a metal, $E°$, (low values give higher cell voltages) and safety. Metals with low reduction potentials (e.g., lithium, potassium, calcium, sodium, and magnesium) react with water to produce hydrogen. However, zinc is stable in water and for that reason it has been used as the negative electrode in primary aqueous battery systems. Moreover, zinc has (a) high abundance and large production which makes it inexpensive; (b) non-toxicity; (c) low redox potential (−0.76 V vs. standard hydrogen electrode (SHE)) compared to other negative electrode materials used in aqueous batteries: and (d) stability in water due to a high overpotential for hydrogen evolution. The latter renders a large voltage window (~2 V) for aqueous zinc-ion batteries (AZIBs) employing a metallic Zn negative electrode.

Vanadium and molybdenum are low cost metals possessing a range of oxidation states (V: +2 to +5; Mo: +2 to +6), which allows for multiple redox and hence large specific capacities for vanadium or molybdenum based electrode materials. Layered $V_nO_m$ (vanadium oxides: $V_2O_5$, $V_3O_8$, $V_4O_{11}$) and $MoO_y$ (molybdenum oxides) that are made of two dimensional sheet structures were the subject of much past investigation for non-aqueous and aqueous alkali (Li and Na) ion batteries. The additional presence of interlayer neutral molecules, ions, metal ions and/or water of hydration in such layered oxides act as pillars, providing structural stability during long term charge discharge cycling.

SUMMARY

The present disclosure discloses a rechargeable Zn battery based on layered/tunnelled structure vanadium/molybdenum oxides, with/without the presence of neutral/cationic/anionic species and/or water molecules inserted into the interlayers/tunnels, of nano/microparticle morphology as robust materials for high rate and long term reversible $Zn^{2+}$ ion intercalation storage at the positive electrode, that are coupled with a metallic Zn negative electrode, and an aqueous electrolyte. The positive electrode may include electronically conducting additives and one or more binders along with the $Zn^{2+}$ intercalation material; the negative electrode is Zn metal in any form; the aqueous electrolyte is may have a pH in a range of 1 to 9 and contains a soluble zinc salt which may be in a concentration range from 0.01 to 10 molar.

Thus, disclosed herein is a zinc ion battery, comprising:
a positive electrode compartment having enclosed therein an intercalation layered positive electrode material $M_xV_2O_5 \cdot nH_2O$, wherein x is in a range from 0.05 to 1, n is in a range from 0 to 2, wherein M is any one or combination of a d-block metal ion, f-block metal ion and alkaline earth ion, the metal M ion being in a +2 to +4 valence state, and wherein said $V_2O_5$ is a layered crystal structure having the metal ions M pillared between the layers, and waters of hydration coordinated to the metal ions M;
a negative electrode compartment having enclosed therein a negative electrode for storing zinc;
a separator electrically insulating and permeable to zinc ions separating the positive and negative compartments; and
an electrolyte comprising water and having a salt of zinc dissolved therein.

There is also disclosed herein a zinc ion battery, comprising:
a positive electrode compartment having enclosed therein and intercalated layered positive electrode material $M_xV_3O_7 \cdot nH_2O$, wherein x is in a range from 0.05 to 1, n is greater than 0 and less than 2, wherein M is any one or combination of a d-block metal ion, f-block metal ion and alkaline earth ion, the metal M ion being in a +2 to +4 valence state, and wherein said $V_3O_7$ is a layered crystal structure having the metal ions M pillared between the layers, and waters of hydration coordinated to the metal ions M and/or hydrogen bonded to the layers;
a negative electrode compartment having enclosed therein a negative electrode for storing zinc;
a separator electrically insulating and permeable to zinc ions separating the positive and negative compartments; and
an electrolyte comprising water and having a salt of zinc dissolved therein.

There is also disclosed a zinc ion battery; comprising:
a positive electrode compartment having enclosed therein an intercalated layered positive electrode material $M_xMoO_y \cdot nH_2O$, wherein x is in a range from 0 to 1, y is in a range from 2 to 3, n is in a range from 0 to 2, wherein M is any one or combination of a d-block metal ion, f-block metal ion and alkaline earth ion, the metal M ion being in a +2 to +4 valence state, and wherein said $MoO_y$ has a layer or tunnel crystal structure, and the metal ions M, if present, pillared between the layers, and waters of hydration coordinated to the metal ions M pillared between the layers;
a negative electrode compartment having enclosed therein a negative electrode for storing zinc; a separator electrically insulating and permeable to zinc ions separating the positive and negative compartments; and an electrolyte comprising water and having a salt of zinc dissolved therein.

A further understanding of the functional and advantageous aspects of the disclosure can be realized by reference to the following detailed description and drawings.

BRIEF DESCRIPTION OF THE DRAWINGS

Embodiments of the disclosure will now be described, by way of example only, with reference to the drawings, in which.

These two electrochemical reactions dictate the potential operating window for aqueous zinc-ion batteries using this electrolyte.

Figure 6A:
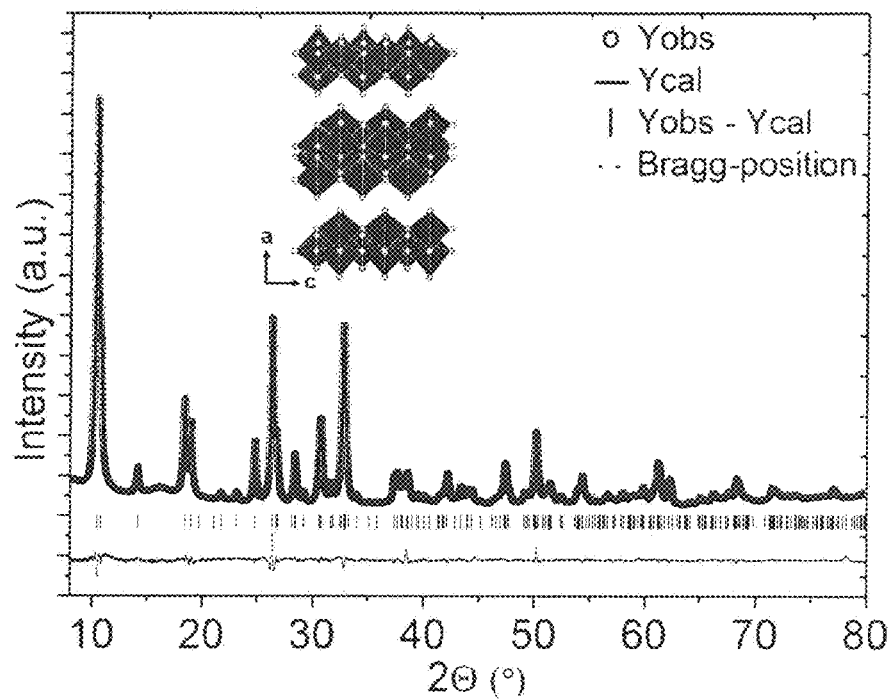

FIG. 6A shows Rietveld refinement of $H_2V_3O_8$. Data points (circles); calculated profile (line); difference profile (dotted line); Bragg positions (vertical lines) are as indicated. Refined lattice parameters are a=16.87 Å, b=9.332 (3) Å, c=3.63 Å, and $\alpha=\beta=\gamma=90°$. Inset shows the layered structure projected in the ac plane. VOx polyhedra are shown in black.

Figure 6B:
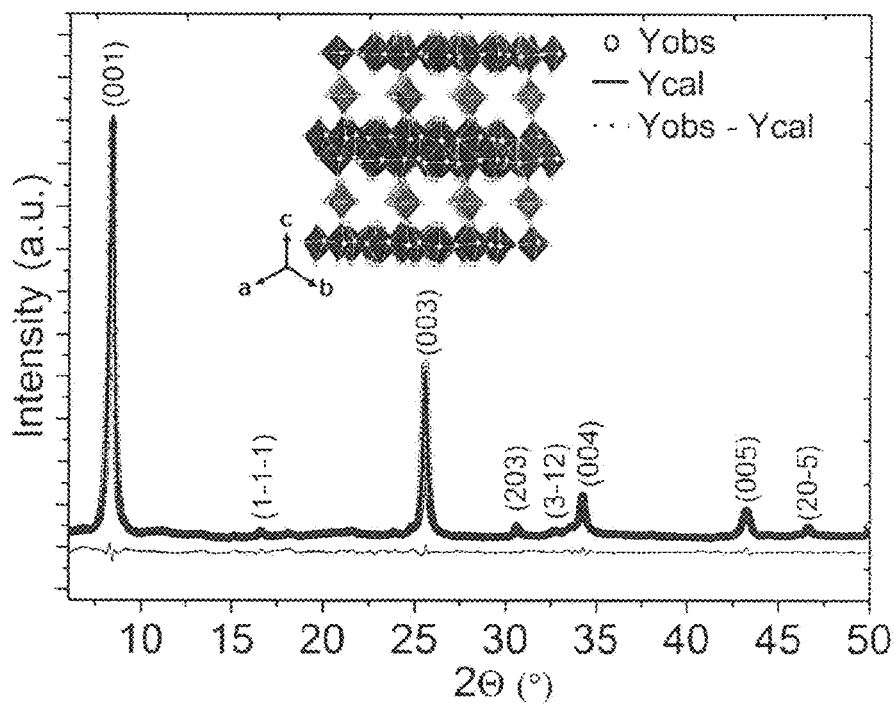

FIG. 6B shows the Rietveld refinement of $Zn_{0.25}V_2O_5 \cdot nH_2O$. Data points (circles); calculated profile (black line); difference profile (blue line) are as indicated. Refined parameters are a=10.75 Å, b=7.77 Å, c=10.42 Å, $\alpha=91.26°$, $\beta=90.31°$, and $\gamma=88.66°$. The $VO_x$ and $ZnO_x$ polyhedra are shown in black and grey, respectively.

FIGS. 7A, 7B, 7C and 7D show a typical SEM image of the $H_2V_3O_8$ (7A and 7B) and $Zn_{0.25}V_2O_5 \cdot nH_2O$ (7C and 7D) nanofibers.

Figure 8B:
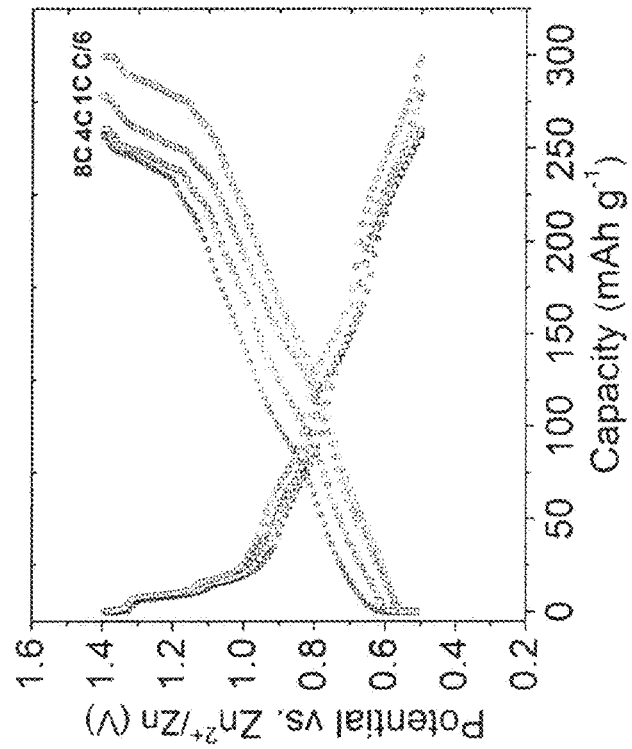
Figure 8A:
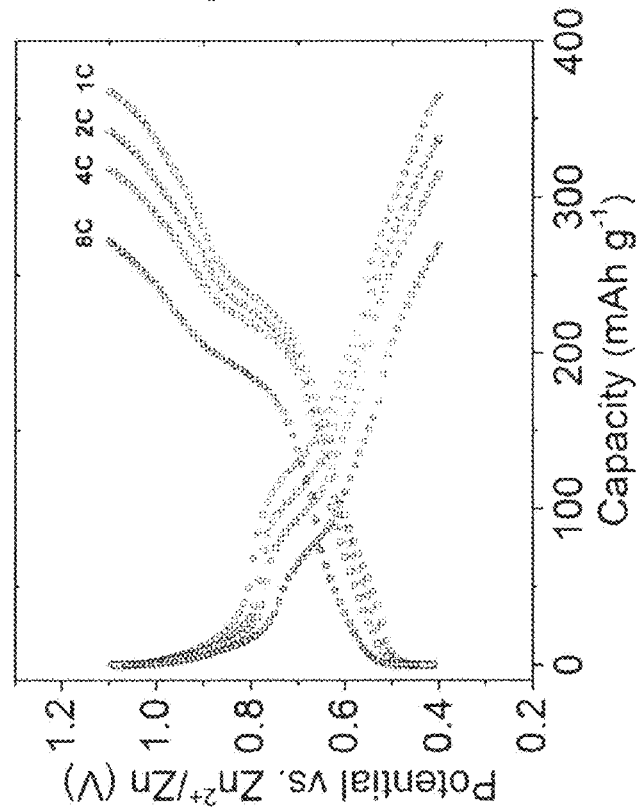
Figures 9A, 9B:
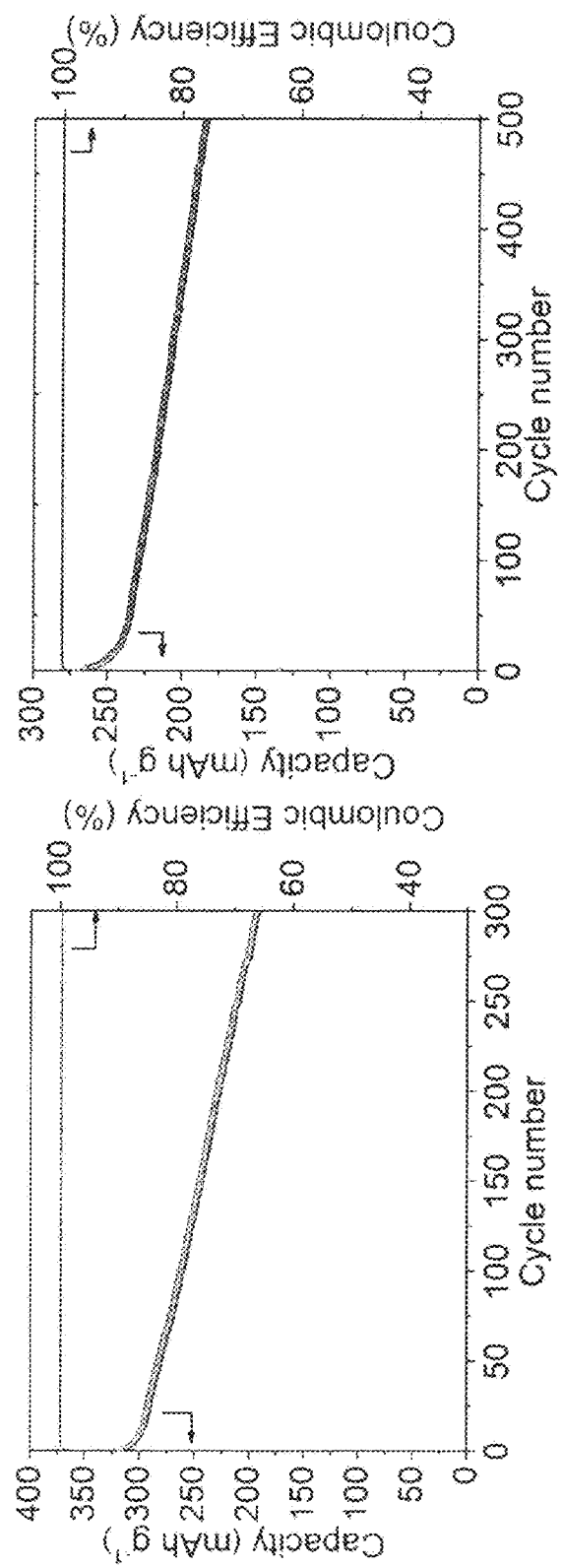
Figures 9C, 9D:
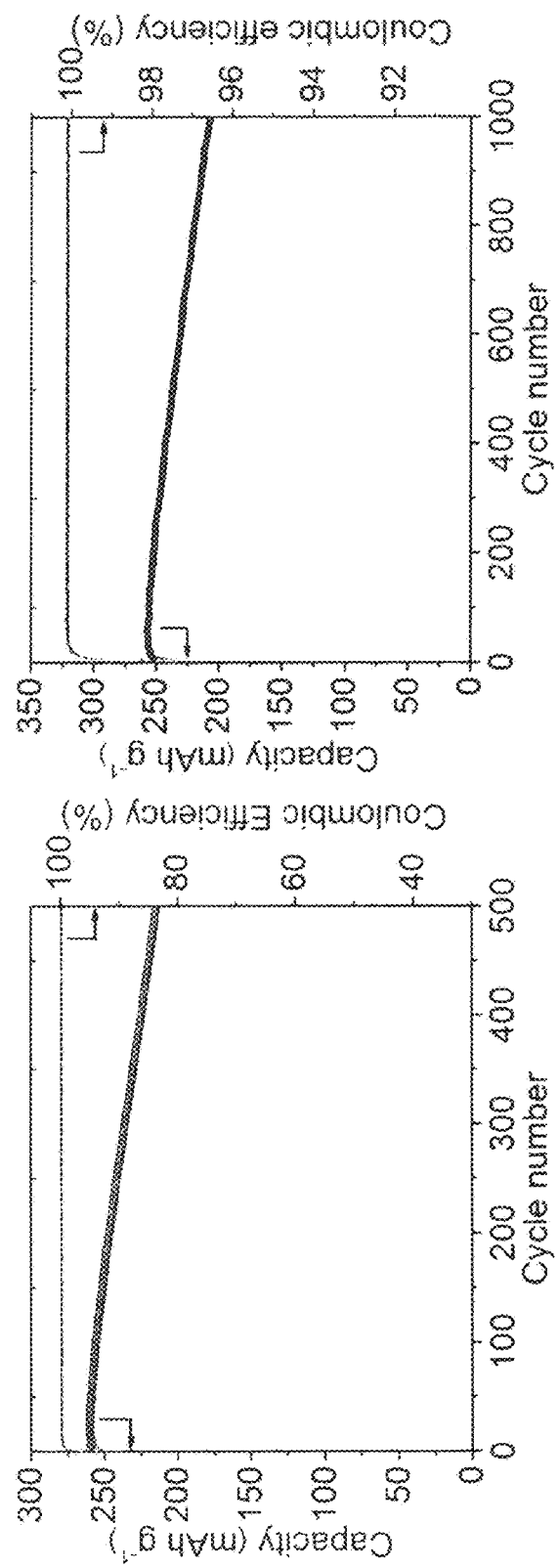

FIGS. 8A and 8B show galvanostatic polarization curves for the (8A) $H_2V_3O_8$ and (8B) $Zn_{0.25}V_2O_5 \cdot nH_2O$ electrodes at various current rates. Here, 1C is defined as 350 mA $g^{-1}$ for $H_2V_3O_8$ and 300 mA $g^{-1}$ for $Zn_{0.25}V_2O_5 \cdot nH_2O$.

FIGS. 9A, 9B, 9C and 9D show specific capacity and coulombic efficiency of the $H_2V_3O_8$ (9A and 9B) and $Zn_{0.25}V_2O_5 \cdot nH_2O$ (9C and 9D) as a function of cycling at 4C (9A and 9C) and 8C (9B and 9D) current rates.

FIGS. 10A and 10B show rate capability of the (9A) $H_2V_3O_8$ and (9B) $Zn_{0.25}V_2O_5 \cdot nH_2O$ cells studied under variable current loading as a function of cycling. The corresponding coulombic efficiencies are also shown.

Figure 11:
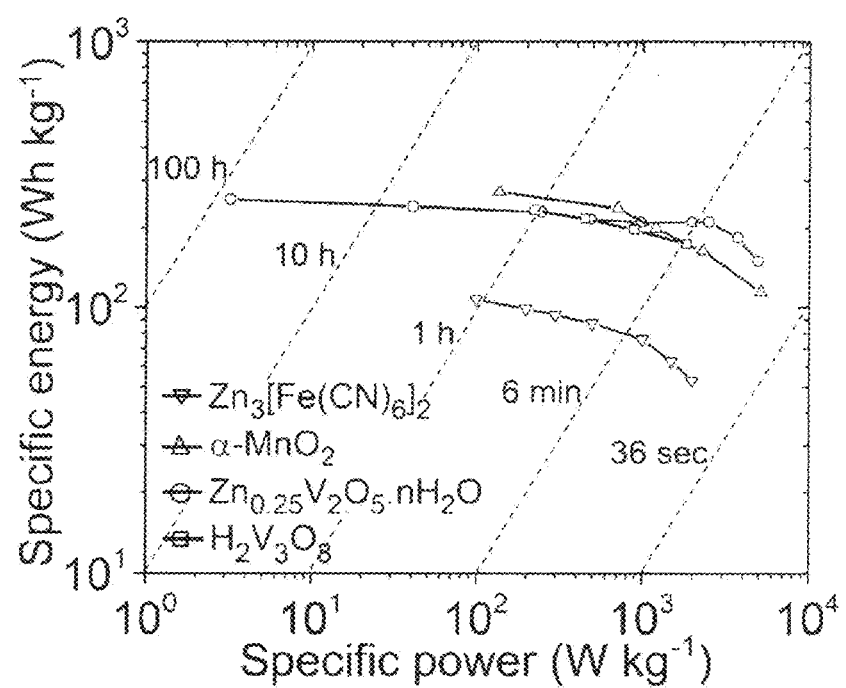

FIG. 11 shows the tradeoff between energy and power density (Ragone plot) for reversible $Zn^{2+}$ storage in $Zn_{0.25}V_2O_5 \cdot nH_2O$, $H_2V_3O_8$, $MnO_2$, and $Zn_3[Fe(CN)_6]_2$.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present disclosure.

As used herein, the term "about", when used in conjunction with ranges of dimensions, temperatures, concentrations or other physical properties or characteristics is meant to cover slight variations that may exist in the upper and lower limits of the ranges of dimensions so as to not exclude embodiments where on average most of the dimensions are satisfied but where statistically dimensions may exist outside this region.

As used herein, the phrase "a negative electrode for storing zinc" means that the negative electrode can incorporate and release zinc reversibly by electrodeposition/dissolution (plating/stripping) of elemental zinc from/to the electrolyte, by alloying/dealloying reaction, or the negative electrode comprises a material that can store zinc by any one or combination of intercalation, conversion, and capacitive storage (adsorption/deadsorption of $Zn^{2+}$ ions).

Figure 1A:
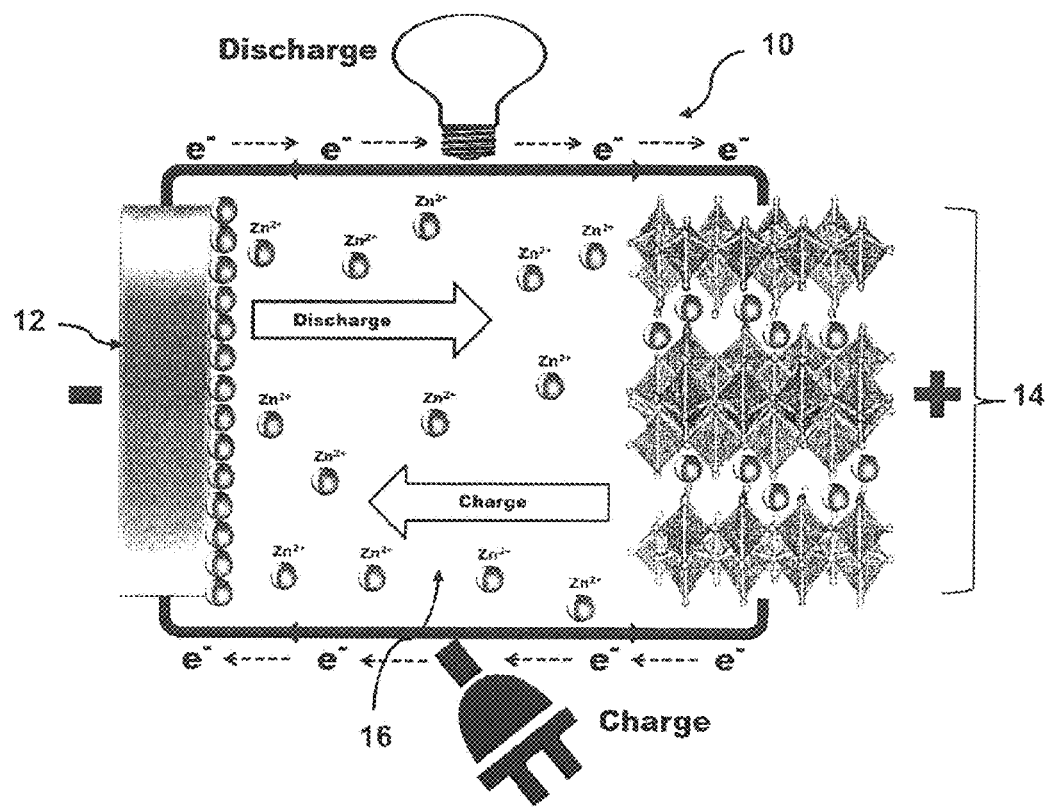
FIG. 1A shows a conceptual scheme of a zinc-ion battery constructed in accordance with the present disclosure.

FIG. 1A shows a conceptual scheme of a zinc-ion battery shown generally at 10, which includes an anode 12, and an intercalated layered positive electrode material 14 separated by an electrolyte 16, with FIG. 1A showing diagrammatically the operation of the battery 10, namely during the charging cycle Zn ions are attracted to the negative electrode 12, and during the discharge cycle Zn ions are attracted to the intercalated positive electrode material 14 into which they intercalate. Electrons flow through the external circuit connecting the negative and positive electrodes which are used to do work.

Figure 1B:
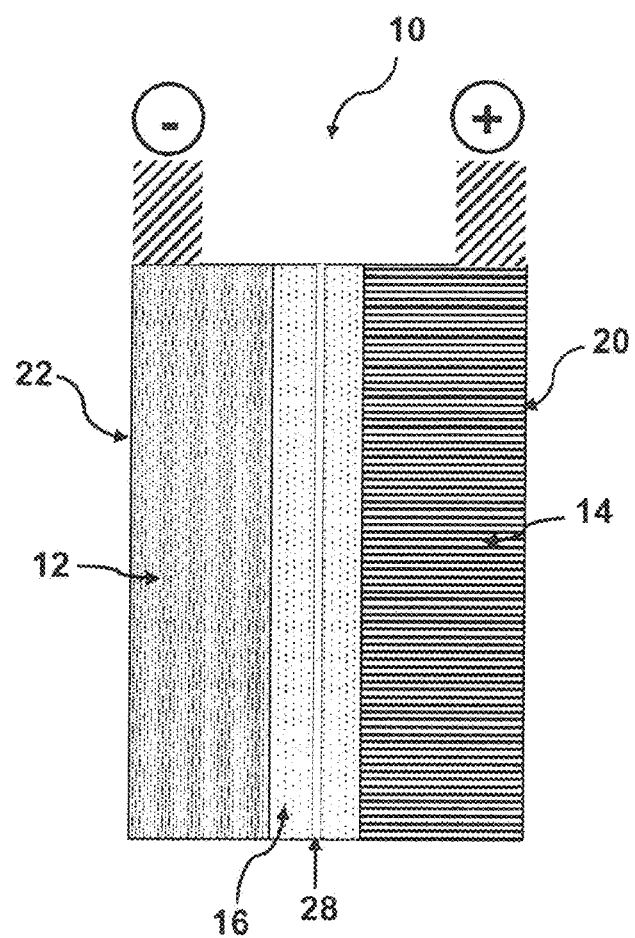
FIG. 1B is a cross section of a zinc-ion battery.

FIG. 1B is a cross section of an actual zinc-ion battery showing the positive electrode 14 contained in a positive electrode compartment 20, the negative electrode 12 contained in a negative electrode compartment 22, and the electrolyte 16 contained in an electrolyte compartment 24 in which a separator 28 which is electrically insulating and permeable to zinc ions separating the positive and negative compartments is located. Non-limiting examples of separator 28 include organic polymers (polyethylene (PE), polypropylene (PP), poly(tetrafluoroethylene) (PTFE), poly(vinyl chloride) (PVC)), polyvinylidene fluoride (PVDF), nylon, organic polymer-inorganic oxide, silica glass fiber, porous silica or alumina ceramic membranes, cellulose, cellulose-ceramic oxide, wood, or any combination of these.

The present disclosure provides several embodiments of the intercalated layered positive electrode material 14. In an embodiment the intercalation layered positive electrode material 14 may be $M_xV_2O_5 \cdot nH_2O$, where x is in a range from 0.05 to 1, n is in a range from 0 to 2, and M is any one or combination of a d-block metal ion, f-block metal ion and alkaline earth ion with the metal M ion being in a +2 to +4 valence state. The $V_2O_5$ has a layered crystal structure having the metal ions M pillared between the layers, and waters of hydration coordinated to the metal ions M. The number of waters of hydration n in some embodiments may be greater than 0 and less than 1. Some of the waters of hydration may be hydrogen bonded to the layers.

In a preferred embodiment x=0.25, and n=1.

In another embodiment, the intercalated layered positive electrode material 14 may be $M_xV_3O_7 \cdot nH_2O$ wherein x is in a range from 0.05 to 1, n is greater than 0 and less than 2. M is any one or combination of a d-block metal ion, f-block metal ion and alkaline earth ion, with the metal M ion being in a +2 to +4 valence state. The $V_3O_7$ is a layered crystal structure having the metal ions M pillared between the layers, and waters of hydration coordinated to the metal ions M and/or hydrogen bonded to the layers. In an embodiment n is greater than 0 and less than 1.

In a preferred embodiment x=0.05, and n=1.

In another embodiment, the intercalated layered positive electrode material 14 may be $M_xMoO_y \cdot nH_2O$, in which x is in a range from 0 to 1, y is in a range from 2 to 3, and n is in a range from 0 to 2. M is any one or combination of a d-block metal ion, f-block metal ion and alkaline earth ion, with the metal M ion being in a +2 to +4 valence state. The $MoO_y$ has a layer or tunnel crystal structure, and the metal ions M, if present, are pillared between the layers, and waters of hydration are coordinated to the metal ions M pillared between the layers.

In some embodiments n is greater than 0 and less than 2. In some embodiments the waters of hydration are hydrogen bonded to the layers.

In a preferred embodiment x=0.25, y=3 and n=0.

The electrolyte 16 is an aqueous based electrolyte and contains a salt of zinc dissolved therein. Non-limiting examples of the zinc salt comprises any one or combination of zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, and zinc bromide to mention a few.

The dissolved zinc is present in an amount in the liquid in a range from about 0.01 to about 10 molar (M), and preferably is present in a range from about 0.1 to about 4 M.

The electrolyte may have a pH in a range between 1 and about 8 but preferably between 4 and about 8 and more preferably 4 to 7. The electrolyte is an aqueous based electrolyte and may be just water containing the dissolved salt of zinc, or additional solvents may be included, for example alcohols, nitriles, carbonates, ethers, sulfoxides, glycols, esters, and amines. Typically, the zinc salt may comprise anyone or combination of zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, and zinc bromide in 0.1 to 4 M concentration of $Zn^{2+}$ with or without the nonaqueous component and with or without additional ionically-conductive salts such as quaternary ammonium salts or alkali metal salts.

The negative electrode may be made of a solid sheet, mesh, or rod of zinc, or it may be comprised of a zinc layer formed on a current collector. When the battery is assembled with metallic zinc contained in the negative electrode, the battery is typically referred to as a zinc battery. This is opposed to a zinc ion battery in which the negative electrode in its initial state does not contain any zinc. The zinc layer may be a thin sheet of zinc or an alloy, or powder zinc bonded adhered to the surface of the negative electrode facing into the negative electrode compartment. The zinc may be a constituent of a formulation which is adhered to the surface of the current collector. Non-limiting examples of zinc alloys that may be used include alloys of zinc with lead, vanadium, chromium, manganese, iron, cobalt, nickel, cadmium, tungsten, bismuth, tin, indium, antimony, copper, and titanium.

The negative current collector is an electrically conductive support for active zinc which may be comprised of any one or combination of carbon, boron, lead, vanadium, chromium, manganese, iron, cobalt, nickel, cadmium, tungsten, bismuth, tin, indium, antimony, copper, titanium, and zinc metal. A feature of the negative electrode is that it comprises a material that can store elemental zinc by any one or combination of intercalation, conversion, and capacitive storage. In a conversion process, the electrochemical reaction of the negative electrode material with zinc leads to its decomposition into two or more products. In capacitive storage the $Zn^{2+}$ ions are stored at the surface of the negative electrode material by a non-faradic process.

The intercalated layered positive electrode material may have different morphologies. The intercalation layered positive electrode material 14 has a nanostructured morphology. Preferably the average particle size is less than 1000 nm in a direction of Zn ion transport through the particle, and more preferably less than 500 nm in a direction of Zn ion transport through the particle. Non-limiting morphologies include nanowires, fibers, wires, cubes, platelets, spheres, and uneven morphology. They may be simple particles. The particles may have a mean size in a range from about 5 nm to about 50 µm.

The particles may be coated with electrically conducting material, in which
the electrically conducting material is any one or combination of carbon powder and conducting polymer. The particles may be embedded in an electrically conducting matrix and the electrically conducting matrix may comprise any one or combination of carbon and conducting polymer, and including a binder. The binder may be any one or combination of styrene butadiene rubber (SBR), sodium carboxymethylcellulose (CMC), polyvinyl acetate (PVAc), polyethylene glycol (PEG), polybutyl acrylate (PBA), polyurethane, acrylonitrile, polypyrrole, polyaniline, polytetrafluoroethylene (PTFE), polyvinylidene fluoride (PVDF), perfluorosulfonic acid (PFSA), and poly(3,4-ethylenedioxythiophene) (PEDOT).

The zinc ion battery materials disclosed herein will now be illustrated by the following non-limiting examples.

EXAMPLES

Two vanadium oxide based compounds with layered crystal structures and in ultralong one-dimensional morphology exhibiting as robust host materials for high rate and long term reversible $Zn^{2+}$ ion storage in aqueous electrolyte were produced. Vanadium is a cheap and environmentally benign metal possessing a range of oxidation states (+2 to +5), which allows for multiple redox and hence large specific capacities for vanadium based electrode materials. Particularly, oxides of vanadium e.g., $V_2O_5$ which is non-toxic and produced in large quantities, displays numerous crystal and compositional chemistries for reversible metal ion storage. Layered $M_xV_nO_m$ oxides (M=metal ion) of compositions such as $V_2O_5$, $V_3O_8$, $V_4O_{11}$ that are made of two dimensional sheet structures have been the subject of intense investigation for both non-aqueous and aqueous alkali (Li and Na) ion batteries. The presence of interlayer metal ions and/or water of hydration act as pillars, providing structural stability during long term charge discharge cycling.

Embodying such qualities are $H_2V_3O_8$ and $Zn_xV_2O_5 \cdot nH_2O$, which we have synthesized in nanofiber morphology by a simple and rapid microwave hydrothermal treatment of $V_2O_5$, without using any toxic or corrosive chemicals, and converted to freestanding film electrodes by adopting a cheaper and greener water based electrode fabrication process. Nanomorphology and compact film structure allows for facile release of strain resulting upon $Zn^{2+}$ cycling, shorter ion diffusion paths, better interaction of carbon additives with the active material and robust conductive wiring—facilitating high specific capacities of ~300 mAh $g^{-1}$ and long term cyclabilities up to 1000 cycles at high coulombic efficiency using fast current rates.

Experimental Methods

Synthesis of $H_2V_3O_8$ and $Zn_xV_2O_5$

Microwave solvothermal method developed over last two decades are now often used to prepare positive electrode materials for lithium ion batteries. In this work, we have modified a time consuming and energy expensive hydrothermal approach used in the synthesis of single crystalline $H_2V_3O_8$ nanobelt to a rapid and scalable microwave hydrothermal method for the synthesis of highly homogeneous $H_2V_3O_8$ and $Zn_xV_2O_8 \cdot nH_2O$ nanofibers. In a typical procedure, 3 to 4 millimoles (mmol) $V_2O_5$ was dispersed in 15:1 water/ethanol (v) mixture with or without stoichiometric amount of zinc acetate (for $Zn_xV_2O_5 \cdot nH_2O$) and transferred to a sealed Teflon vessel. The vessels were fitted to a rotor equipped with temperature and pressure sensors. The rotor containing the vessels was then placed in a rotating platform for uniform heating in an Anton Parr microwave synthesis system (Synthos 3000). The system temperature was raised to 180° C. in 10 minutes and maintained for 60 to 90 minutes. The preset temperature was maintained automatically by continuous adjustment of the applied power (limited to 800 Watts). The as-synthesized product was thoroughly washed with distilled water followed by a small amount of iso-propanol and dried at 60° C. for 24 h.

Characterization Methods

Powder X-ray diffraction was performed on a Bruker D8-Advance powder diffractometer equipped with Vantec-1 detector, using Cu-Kα radiation (λ=1.5405 Å) in the range from 5° to 80° (2θ) at a step size of 0.025° using Bragg-Brentano geometry. X-ray data refinement was carried out by conventional Rietveld refinement method using the Bruker-AXS TOPAS 4.2 software (Bruker-AXS, 2008). The background, scale factor, zero point, lattice parameters, atomic positions and coefficients for the peak shape function were iteratively refined until convergence was achieved. The morphologies of the samples were examined by field-emission scanning electron microscopy (FE-SEM, LEO 1530) equipped with an energy dispersive X-ray spectroscopy (EDX) attachment.

Battery Cycling

For electrochemical performance evaluation, a freestanding film type electrode was fabricated by a facile green approach. In a typical process, nanofibers were mixed with conducting nanocarbon Super P® and water based composite binder carboxymethylcellulose (CMC) and styrene-butadiene rubber(SBR) (CMC/SBR=2:1) in 70:27:3 weight ratio. The mixture was dispersed in small amount of water by using an ultrasonic mixer to obtain a stable homogeneous ink which was filtered through Durapore® DVPP 0.65 µm filtration membrane. The water soluble CMC facilitates the dispersion of hydrophobic carbon particles into water and enables its intimate mixing with the nanofibers. Whereas SBR with high binding abilities for a small amount provides adhesion and electrode flexibility. The binder molecules not involved in this anchoring and adhesion get washed away during filtration and that way electrode films with very small binder content is achieved. After drying at 60° C. the composite film automatically came off which was then punched into 1 $cm^2$ electrode coins. The electrodes were further dried at 180° C. for 1 h ($H_7V_3O_8$) or 60° C. for 12 h (for $Zn_xV_2O_5 \cdot nH_2O$). The electrochemical properties were investigated in PFA based Swagelok® type cell using 1 M $ZnSO_4$ in water as the electrolyte and titanium or stainless steel rods as the current collector. The $H_2VO_8$ or $Zn_xV_2O_5 \cdot nH_2O$ and zinc foil served as the positive and negative electrodes, respectively. Galvanostatic cycling studies were performed using multichannel biologic VMP3 potentiostat/galvanostat.

Three-Electrode Electrochemical Measurements

The voltammetric electrochemical experiments were performed with a three-electrode cell consisting of the working electrode, Pt mesh (1 $cm^2$) as the counter electrode, and an Ag/AgCl (3 M KCl) reference electrode. The working electrodes examined were a Zn disk (φ=2 mm), a Ti disk (φ=2 mm), a stainless steel rod (316 grade, φ=12 mm), and the $H_2V_3O_8$ composite electrode. Cyclic voltammetry was performed at a scan rate of 5 mV/s and linear sweep voltammograms were acquired at 1 mV/s. These techniques were controlled with a CHI700E potentiostat (CH Instruments, Inc.). The electrolytes used were 1 M $Na_2SO_4$ for the hydrogen evolution reaction and 1 M $ZnSO_4$ for zinc plating/stripping and the oxygen evolution reaction. All experiments were performed at room temperature (23±2° C.).

Results and Discussion

The operating voltage of all secondary aqueous batteries is limited by the potentials for hydrogen evolution and oxygen evolution from water electrolysis. Since both the hydrogen and oxygen evolution reactions (HER and OER, respectively) are pH dependent (see reactions 2 to 5) and catalytic in nature, the precise potential at which they occur is sensitive to the electrolyte composition and electrode material. HER and OER occur during charge at the negative and positive electrodes, respectively, and are displayed below in reactions 2 to 5, while the zinc deposition reaction is shown in reaction 1:

Cathodic Reactions:

Zinc Deposition:

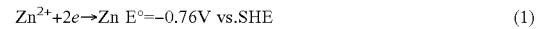
$$Zn^{2+}+2e^- \rightarrow Zn \quad E°=-0.76V \text{ vs.SHE} \tag{1}$$

Hydrogen Evolution Reaction (HER):

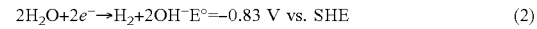
$$2H_2O+2e^- \rightarrow H_2+2OH^- \quad E°=-0.83 \text{ V vs. SHE} \tag{2}$$

$$2H^++2e^- \rightarrow H_2 \quad E°=0.00 \text{ V vs. SHE} \tag{3}$$

Anodic Reactions:

Oxygen Evolution Reaction (OER):

$$4OH^- \rightarrow O_2+2H_2O+4e \quad E°=0.40 \text{ V vs. SHE} \tag{4}$$

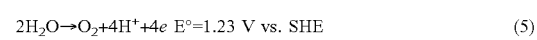
$$2H_2O \rightarrow O_2+4H^++4e \quad E°=1.23 \text{ V vs. SHE} \tag{5}$$

Figure 2:
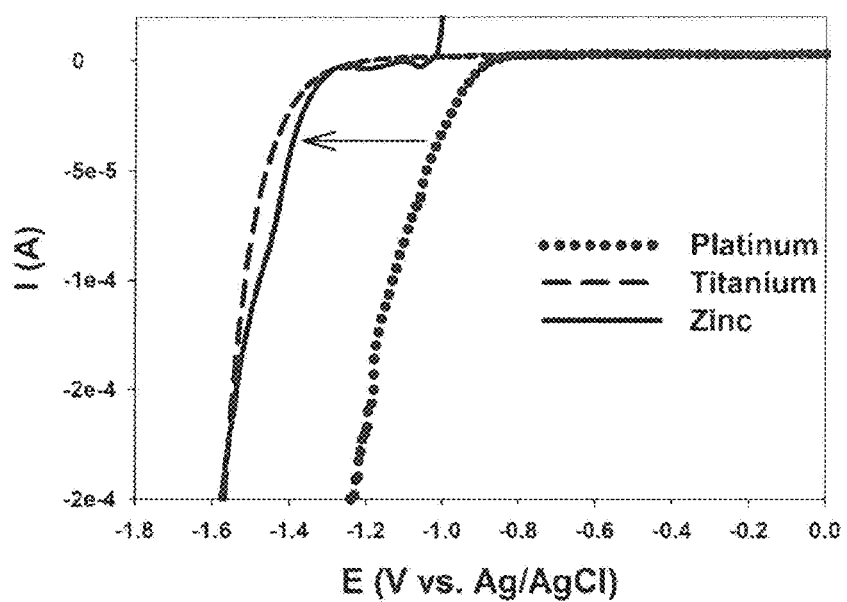
FIG. 2 shows linear sweep voltammograms at 1 mV/s on Pt, Ti, and Zn in 1 M $Na_2SO_4$ showing the onset of the hydrogen evolution reaction.
Figure 3A:
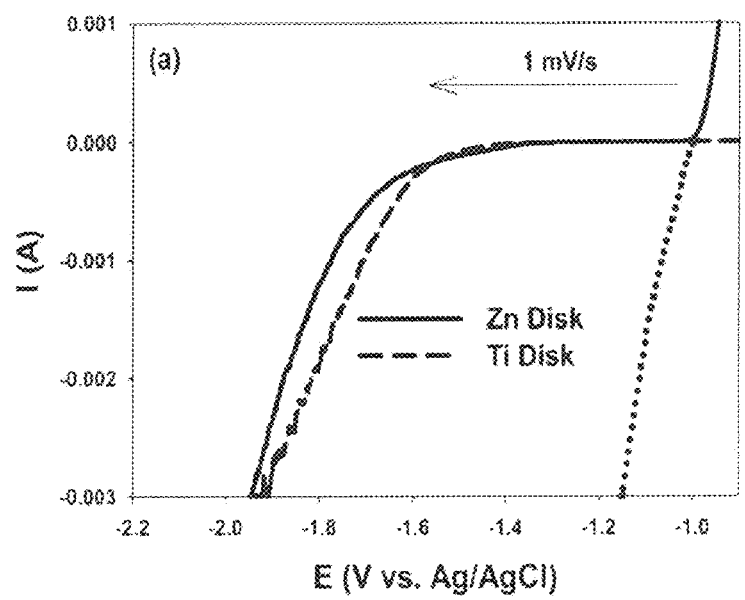
FIG. 3A shows a linear sweep voltammogram at 1 mV/s in 1 M $Na_2SO_4$ showing the hydrogen evolution reaction for zinc and titanium. The dotted voltammogram shows zinc deposition on a zinc disk electrode in 1 M $ZnSO_4$ for comparison.
Figure 3B:
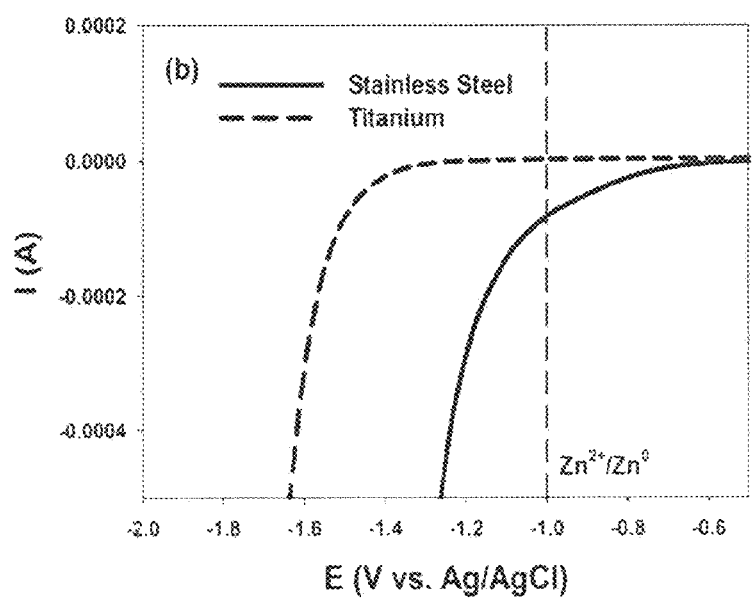
FIG. 3B shows a linear sweep voltammogram at 1 mV/s in 1 M $Na_2SO_4$ showing the hydrogen evolution reaction for stainless steel and titanium.

To examine the suitability of a metallic zinc negative electrode for secondary zinc-ion batteries, linear sweep voltammetry was used to probe the HER. In FIG. 2, a zinc-ion-free (1 M $Na_2SO_4$) electrolyte was used which contained the same concentration of the sulfate anion and similar pH value (4-5) as the 1 M $ZnSO_4$ electrolyte used for all other studies. Here, it can be seen that the hydrogen evolution reaction has an overpotential of ~0.4 V with respect to Pt on both zinc metal and titanium metal. Titanium was found to be an excellent current collector for the negative, comparable to Zn itself, as evident from FIG. 3A, which also shows that zinc deposition on a zinc electrode in 1 M $ZnSO_4$ occurs at a higher potential than the HER. Stainless steel was deemed to be unsuitable as a current collector for the negative electrode as it catalyzes the HER and competes with zinc electrodeposition (FIG. 3B).

Figures 4A, 4B:
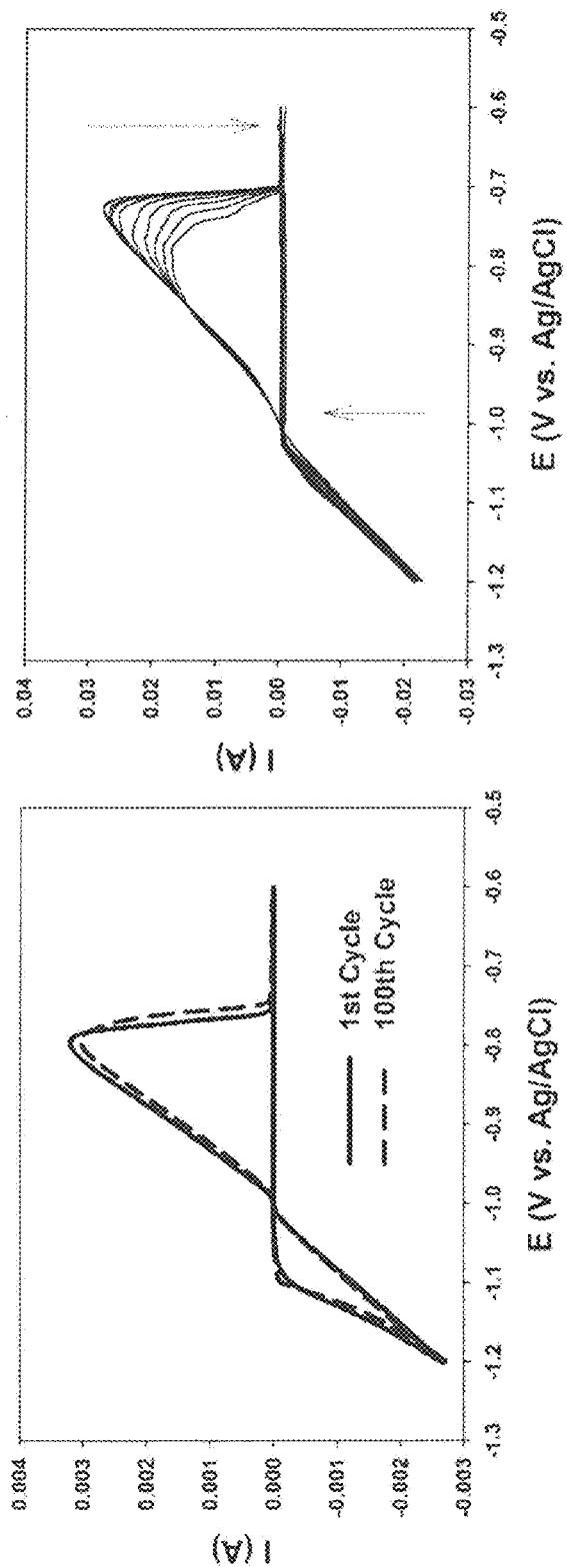
FIG. 4A shows cyclic voltammograms at 5 mV/s on a Ti disk electrode.
FIG. 4B shows cyclic voltammograms at 5 mV/s on stainless steel rod in 1 M $ZnSO_4$.

On the other hand, zinc deposition and stripping was completely reversible on titanium as displayed in FIG. 4A. The coulombic efficiency ($Q_{ox}/Q_{red}$) was 100% over 100 cycles on titanium with no loss in the electrical charge (Q) for deposition or stripping. Stainless steel suffered from a decay in both $Q_{red}$ and $Q_{ox}$, even for the first 10 cycles (FIG. 4B). On stainless steel the coulombic efficiency was only 87% for the first cycle and 74% for the tenth cycle. This shows that the excess charge during reduction ($Q_{red}$) goes towards the HER.

Since the OER dictates the maximum potential for the positive electrode, this was first examined on stainless steel, a practical current collector material. Titanium also has a high overpotential for OER, however, we suspect that OER on many $Zn^{2+}$-intercalation materials will have activity similar to stainless steel which is why we show the result for OER on stainless steel rather than titanium.

Figure 5:
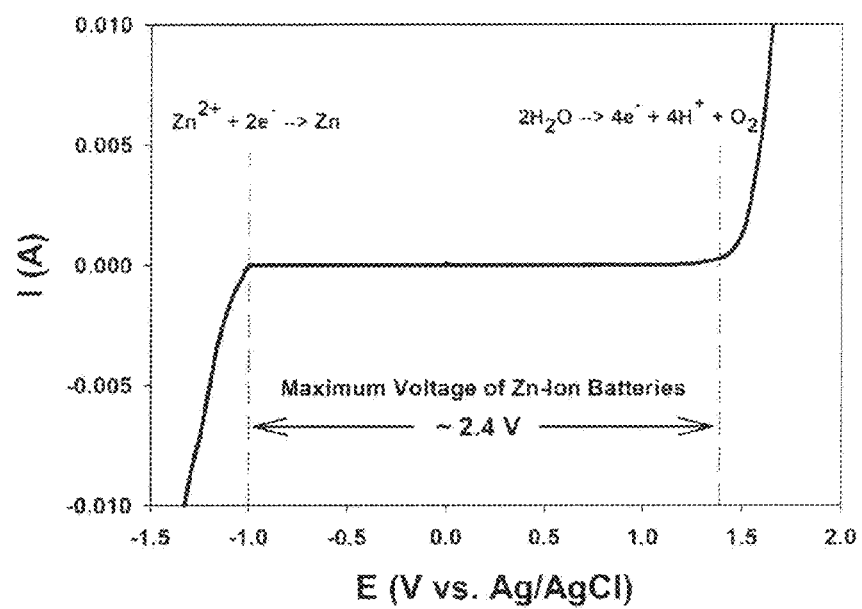
FIG. 5 shows linear sweep voltammograms on a zinc disk electrode (cathodic sweep) and a stainless steel disk electrode (anodic sweep) at 1 mV/s in 1 M $ZnSO_4$. The cathodic sweep on zinc shows zinc deposition and the anodic sweep on the stainless steel shows the oxygen evolution reaction.

FIG. 5 displays the linear voltammograms for Zn electrodeposition onto a Zn disk and OER on a stainless steel rod in 1 M $ZnSO_4$ at 1 mV/s. This plot provides the maximum possible operating voltage window of a secondary Zn-ion battery using 1 M $ZnSO_4$ which is ~2.4 V. Obviously, the positive electrode of choice must be tested, particularly if a high-voltage material is to be used. In our case, the upper voltage cut-off for batteries with $H_2V_3O_8$ and $Zn_xV_2O_5.nH_2O$ are 1.1 V and 1.4 V respectively, which is well below the limit at which OER will occur at these materials.

The hydrothermal method has evolved into an important wet chemistry method for the synthesis of nanostructured vanadium oxide materials. However, such process could though be time consuming, as in the synthesis of $H_2V_3O_8$ nanobelts which requires hydrothermal treatment of $V_2O_5$ in water for 2-3 days at 210° C. By introducing the microwave heat treatment, we have developed a versatile and scalable synthetic approach for the rapid synthesis of ultralong $H_2V_3O_8$ and $Zn_xV_2O_5.nH_2O$ nanofibers. Water is known to strongly interact with the microwave radiation via a dipolar-microwave interaction, leading to rapidly superheated local regions in the reaction media. In contrast to typical hydrothermal methods where slow heating mainly occurs via thermal conduction mechanism, heating of the entire reaction media through penetration of microwaves triggers rapid intercalation-exfoliation and cleavage of $V_2O_5$ into nanosheets and finally into $H_2V_3O_8$ or $Zn_xV_2O_5.nH_2O$ nanofibers.

Phase purity of the as-synthesized materials was confirmed by Rietveld refinement of the powder diffraction pattern as shown in FIG. 6A for $H_2V_3O_8$ and FIG. 6B for $Zn_xV_2O_5.nH_2O$. The XRD pattern in FIG. 6A could be refined to an orthorhombic Pnam $V_3O_7.H_2O$ ($H_2V_3O_8$) with the lattice parameters of a=16.87 Å, b=9.33 Å, c=3.63 Å, and α=β=γ=90°. Here $V_3O_8$ layers, which are constructed of $VO_6$ octahedra and VO5 trigonal bipyramids, are held by strong hydrogen bonding together with van der walls interaction. The $H_2O$ molecule bound to the vanadium atom in place of one oxygen in $VO_6$ octahedra creates hydrogen bond with the octahedra in the next layer, forming a layered 3D structure. The hydrogen bonded layered structure is found to be very stable up to a temperature of ~300° C. when the structure dehydrates.

The pattern in FIG. 6B was refined to a composition of $Zn_{0.25}V_2O_5.H_2O$ crystallizing in P-1 triclinic system with lattice parameters of a=10.75 Å, b=7.77 Å, c=10.42 Å, α=91.26°, β=90.31°, and γ=88.66°, which closely resemble the $Zn_{0.25}V_2O_5.H_2O$ phase for which the structure was solved by single crystal diffraction. Here the structure consists of $V_2O_5$ layer, built up of $VO_6$ octahedra, $VO_5$ trigonal bypyramids, and $VO_4$ tetrahedra, stacked along c axis with the interlayer Zn atom coordinating to the oxygen apices on opposite sides and the oxygen atoms of the in plane water molecules.

Figure 7B:
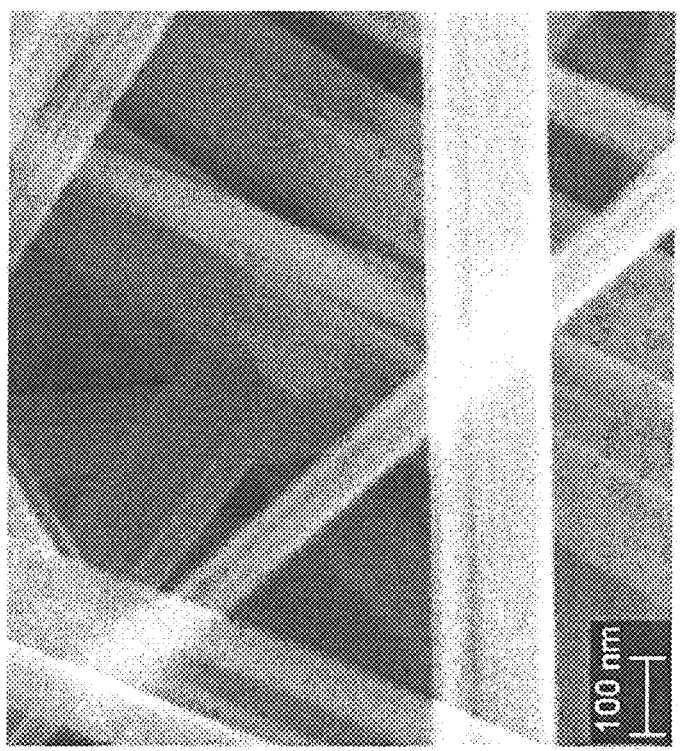
Figure 7A:
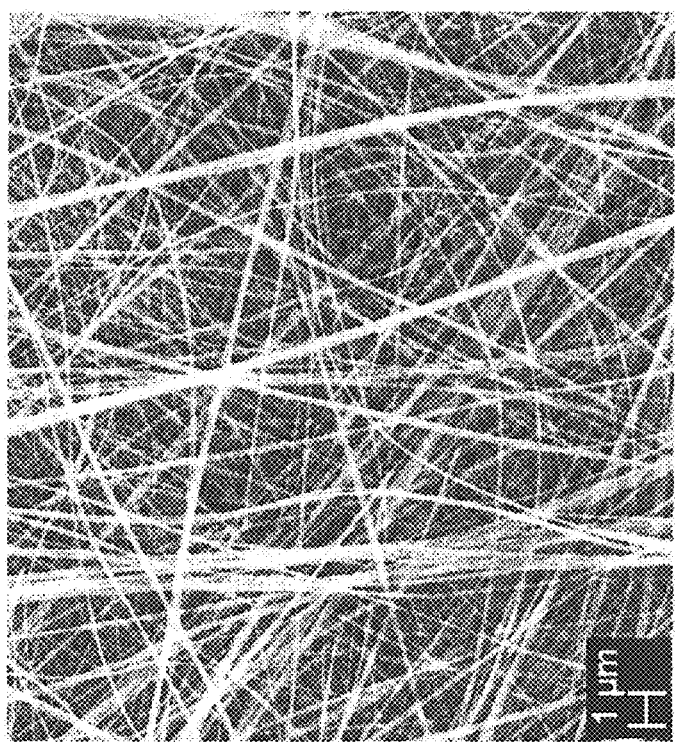
Figure 7D:
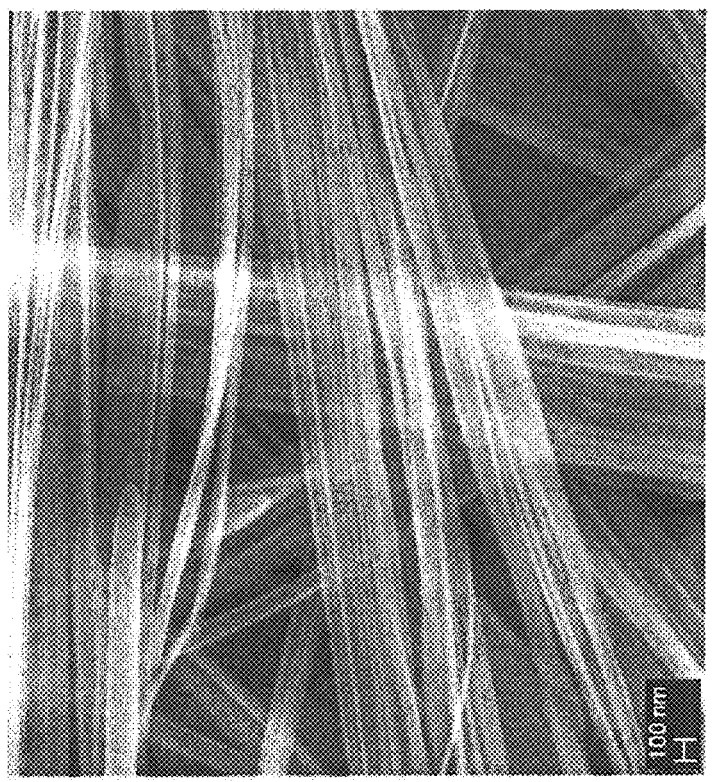
Figure 7C:
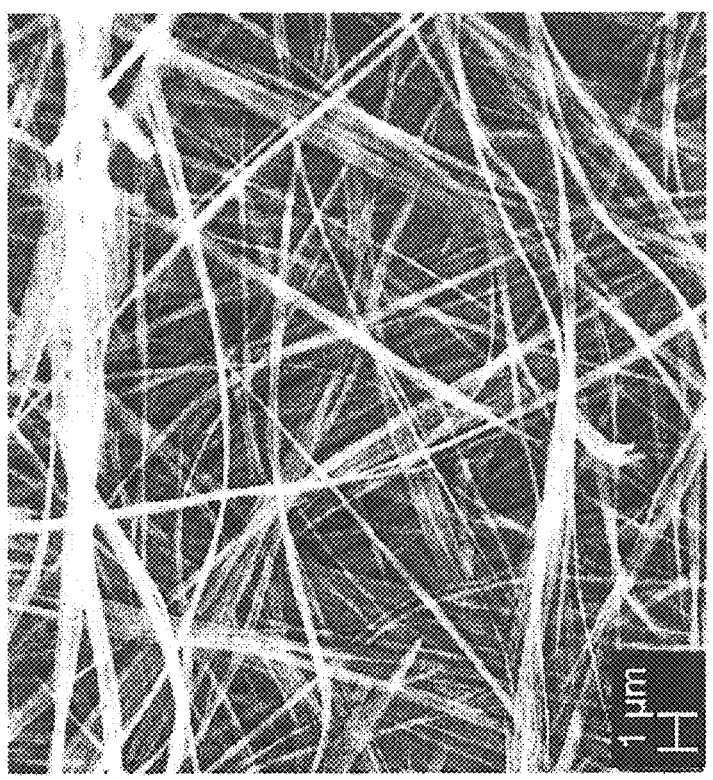

SEM investigation as presented in FIGS. 7A, 7B, 7C and 7C reveals highly uniform and ultralong one dimensional morphology for both the materials. At a closer look, $H_2V_3O_8$ (FIGS. 7A and 7B) appears to have a ribbon like morphology and $Zn_{0.25}V_2O_5.H_2O$ (FIGS. 7C and 7D) seems to adopt a feather like structure. Both the fibers have a diameter of about 100 nm. To the inventors' knowledge, this is first time $Zn_{0.25}V_2O_5.H_2O$ has been synthesized in such nanomorphology.

Unlike conventional NMP (N-methyl-2-pyrrolidone) based Li-ion battery electrode slurry fabrication, which is expensive and time consuming due to the use of NMP, we have developed a novel and versatile electrode fabrication approach in this work. A water based ink was prepared for both the material by ultrasonic dispersion with conductive carbon and minimum (3%) amount of aqueous based binder CMC and SBR. The ink was passed through a PVDF based membrane filter resulting in a compact film, which upon drying (at 60° C.) spontaneously comes off the hydrophobic membrane due to the hydrophilic nature of the oxide based electrode film. The wool like textile morphology of the used materials facilitate dense mat type film electrode formation. Notably, the thickness and the loading of the film can be easily varied by adjusting the amount of ink and the PVDF membrane filter can be reused multiple times. The use of water as the solvent and water based cheap binders along with the recurring use of the PVDF filter membrane makes the process very cost effective and environmentally green. The use of freestanding film electrode also allow us to avoid possible corrosion issues of metal foil, which is otherwise used to deposit an electrode film, and focus on electrochemical zinc storage properties of the active materials only.

The reversible electrochemical $Zn^{2+}$ storage capabilities of $H_2V_3O_8$ and $Zn_{0.25}V_2.H_2O$ were explored in full cells by applying galvanostatic techniques. The electrodes were studied in different voltage windows to elucidate the optimal voltage range for highly reversible electrochemical cycling. Based on this study, voltage windows of 0.4 V-1.1 V and 0.5-1.4 V vs. Zn were determined for the $H_2V_3O_8$ and $Zn_{0.25}V_2O_8.H_2O$ electrodes, respectively, which clearly fall within the safe operational window in aqueous electrolyte (1 M $ZnSO_4$ in $H_2O$) using Zn anode and Ti rod as the current collector (see discussion above). Cycling in larger voltage window results in higher specific capacities, but structural stress generated from the insertion of large amount of zinc results in pulverization of the electrode and rapid capacity fading and therefore was avoided. Moreover, a practical voltage window not only enable better cyclability, but also ensure lesser voltage polarization and an adequate operating voltage suitable for practical application.

FIGS. 8A and 8B show the voltage polarization curves for the two electrodes at different current rates. A rate of 1C (the C-rate is a measure of rate at which the cell is discharged or charged relative to its maximum capacity; a 1C rate means that the discharge/charge current will discharge/charge the cell in 1 h) was defined as 350 mA g$^{-1}$ and 300 mA g$^{-1}$ for $H_2V_3O_8$ and $Zn_{0.25}V_2O_8.H_2O$ respectively, based on the highest capacity achieved at a moderate current density. FIG. 8A demonstrates the variation of cell voltage for $H_2V_3O_8$ electrode as a function of obtainable specific capacity. The voltage profile shows a small plateau delivering ~100 mAh g$^{-1}$ of capacity at around 0.8 V, following which it varies in slope registering high specific capacity of 325 mAh g$^{-1}$ and 270 mAh g$^{-1}$ at high rates of 4C (1400 mA g$^{-1}$) and 8C (2800 mA g$^1$), respectively. Depending on the applied current rates close to 1.5 to 2, $Zn^{2+}$ ions are electrochemically intercalated during discharge. An average operating voltage of ~0.64 V is obtained for this electrode irrespective of the rate. On the contrary $Zn_{0.25}V_2O_5.H_2O$ electrode demonstrates a higher average operating voltage of ~0.8 V at all current densities (FIG. 8B). This is most likely the consequence of higher average oxidation state of V in $Zn_{0.25}V_2O_5.H_2O$ ($V^{4.8+}$) compared to that in $H_2V_3O_8$ ($V^{4.66+}$) including the effect from structural energetics.

For $Zn_{0.25}V_2O_5.H_2O$, typical discharge-charge polarization curves display sloping behavior with some small plateau like feature, suggesting a dominant solid-solution type process associated with electrochemical zinc (de)insertion. Interestingly, at higher current rates, discharge-charge capacities increased with cycling, reaching highest value after some cycling. This is most likely related to the kinetic limitation of $Zn^{2+}$ diffusion into the layered structure of the electrode, requiring multiple discharge-charge cycles to open up accessible intercalation sites, before optimal capacity could be achieved. The $Zn_{0.25}N_2O_5.H_2O$ electrodes registered a specific capacity of ~300 mAh g$^1$ (at C/6: 50 mA g$^{-1}$), which is slightly lower than the $H_2V_3O_8$ electrode. Typically, about 1.2 $Zn^{2+}$ ions are intercalated per mole of $Zn_{0.25}V_2O_5.H_2O$ during the electrochemical discharge process. The high specific capacities obtained for both materials can be ascribed to the large specific surface area and short diffusion distances provided by the nanofiber morphology. It is also important to note that for both the electrodes the voltage polarization curves recorded in the subsequent cycles exhibit identical feature as the first cycle, indicating that the initial structure is recovered at the end of each charge cycle.

As a result of nanostructural morphology, flexible film like electrode architecture, and structural reversibility upon $Zn^{2+}$ de(intercalation) both the electrodes demonstrate superior cyclability at high current rates. FIGS. 9A to 9D show specific capacity and coulombic efficiency of the $H_2V_3O_8$ (FIG. 9A and FIG. 9B) and $Zn_{0.25}V_2O_5.H_2O$ (FIG. 9C and FIG. 9D) as a function of cycling at 4C (FIG. 9A and FIG. 9C) and 8C (FIG. 9B and FIG. 9D) current rates (For the definition of C rate for $H_2V_3O_8$ and $Zn_{0.25}V_2O_5.H_2O$ see above). As evident, the $Zn_{0.25}V_2O_5.H_2O$ based cell registered excellent cyclability at 8C rate, retaining 80% of the initial specific capacity after 1000 cycles. At 4C, a similar cell delivered 500 cycles with only 20% drop in the initial capacity. Whereas, identical $H_2V_3O_8$ cells demonstrated slightly inferior capacity retention delivering about 40% and 30% of the initial reversible capacity at the end of 300 and 500 cycles, when operated at current rate of 4C and 8C, respectively.

It is important to note that the $H_2V_3O_8$ cell showed distinctively better cycling behavior at higher current rate (8C). This can be linked to the comparatively lower amount $Zn^{2+}$ intercalation per mole of $H_2V_3O_8$, leading to lesser structural strain, which ensures better cyclability. However this feature is not very prominent for the $Zn_{0.25}V_2O_5.H_2O$ based electrode, which suggests higher structural flexibility of $Zn_{0.25}V_2O_5.H_2O$ towards $Zn^{2+}$ (de)intercalation. Higher structural flexibility granted by the presence of interlayer $Zn^{2+}$ ions also ensures excellent electrochemical cyclability of the $Zn_{0.25}V_2O_5.H_2O$ cells. On the contrary, hydrogen bonded $VO_x$ interlayer in $H_2V_3O_8$ lack structural rigidity and flexibility of $Zn_{0.25}V_2O_5.H_2O$, resulting in slightly poor capacity retention. For all the studies nearly 100% coulombic efficiency was registered as a function of cycling, which further confirms the high degree of reversibility of electrochemical $Zn^{2+}$ (de)intercalation into the layered structure of presented vanadium oxide materials.

By virtue of 1D nanomorphology and film like compact yet flexible electrode architecture both the materials delivered splendid rate performance under variable current loading as a function of cycling, FIG. 10A shows rate capability of $H_2V_3O_8$ and FIG. 10B shows rate capability of $Zn_{0.25}V_2O_5.H_2O$ cell studied under variable current loading as a function of cycling. The corresponding coulombic efficiencies are also shown. The results are shown in FIGS. 10A and 10B together with the corresponding coulombic efficiencies registered at variable rates. As expected, $Zn_{0.25}V_2O_5.H_2O$ electrode demonstrates better rate capability; starting with an initial capacity of 285 mAh g$^{-1}$ at 10 rate, the cell delivers 260 mAh g$^{-1}$ of durable capacity at 8C, which reverts back to 285 mAh g$^{-1}$ of capacity at 10 rate, nearly identical to the initial 1C capacity. Whereas $H_2V_3O_8$, starting with a slightly higher initial 1C capacity of 335 mAh g$^{-1}$ falls to 222 mAh g$^{-1}$ of capacity at 80 rate, which doesn't completely recover at 1C at the end of variable current load test. Similar to electrochemical cyclability, better rate performance of $Zn_{0.25}V_2O_5.H_2O$ compared to the $H_2V_3O_8$ electrode is attributed to its more robust and flexible layered structure which is efficiently pillared by immobile $Zn^{2+}$ ions. In both cases, coulombic efficiency increases with current load, which is expected as the unwanted side reactions are suppressed at higher current rates.

Based on the galvanostatic cycling and rate performance results, energy and power densities could be calculated and are presented in the Ragone plot shown in FIG. 11. The specific energy density is the total energy that can be derived per unit mass of the active electrode material at the cathode. It is the product of specific discharge capacity (Q in mAh g$^{-1}$) based on the total mass of the active electrode material and the operating voltage in one full discharge. The power density is obtained from the product of current density and average operating voltage.

As evident, beside good cyclability and excellent rate capability, both the $H_2V_3O_8$ and $Zn_{0.25}V_2O_5.H_2O$ based cells delivers good energy density at high power density in comparison to α-$MnO_2$ (see reference 1) and $Zn_3[Fe(CN)_6]_2$, see reference 2. $Zn_{0.25}V_2O_5.H_2O$ exhibits the highest energy density of the three positive electrodes at high power and delivers a steady and high energy density over a wide range of power.

CONCLUSIONS

In summary, we have developed two novel layered vanadium oxide nanomaterials for highly reversible $Zn^{2+}$ storage at high current rates and long term cyclability. Besides, a simple scalable microwave synthesis of vanadium oxide nanomaterials and a versatile water based environmentally green electrode fabrication process is presented. As has been found, presence of stable interlayer species, e.g., $H_2O$ in $H_2V_3O_8$ and $Zn^{2+}$ and/or $H_2O$ in $Zn_{0.25}V_2O_5 \cdot H_2O$ plays pivotal role in stabilizing the layered structure against repeated $Zn^{2+}$ de(intercalation), and thereby enables long term cyclability with high specific capacities. Although the average operating cell voltages (0.64 V for $H_2V_3O_8$ and 0.81 V for $Zn_{0.25}V_2O_8 \cdot H_2O$) are rather modest, high specific capacities of ~300 mAh $g^{-1}$ ensure high energy density (230-280 Wh $kg^{-1}$), highest on record among the known aqueous Zn-ion batteries (see Table 1 below). Good energy density, impressive rate performance and cyclability, cost effective scalable processing of raw materials and electrodes, and not the least high abundance and production of zinc metal make these aqueous zinc ion secondary cells viable candidates for large scale application like grid storage.

TABLE 1

Operating voltage, energy density, and cycling performance of different rechargeable aqueous Zn-ion batteries.

| Positive/Negative Electrodes | Average Operating Voltage (V) | Energy Density (Wh kg$^{-1}$) | Capacity Retention (Rate) | Reference |
|---|---|---|---|---|
| α-MnO$_2$/Zn | 1.3 V | 225 | 75% After 100 cycles (6 C rate) | 1 |
| Zinc-hexacyanoferrate/Zn | 1.7 V | 100 | 75% After 100 cycles (1 C rate) | 2 |
| H$_2$V$_3$O$_8$/Zn | 0.64 V | 230 | 70% after 500 cycles (8 C rate) | Present Work |
| Zn$_{0.25}$V$_2$O$_5$·H$_2$O/Zn | 0.81 V | 280 | 80% after 1000 cycles (8 C rate) | Present Work |

The foregoing description of the preferred embodiments of the present disclosure has been presented to illustrate the principles of the invention and not to limit the disclosure to the particular embodiments illustrated and described. It is intended that the scope of the invention be defined by all of the embodiments encompassed within the following claims and their equivalents.

REFERENCES

1. C. J. Xu, B. H. Li, H. D. Du, F. Y. Kang, Angew. Chem. Int. Ed. 2012, 51, 933.
2. Zhang, L.; Chen, L.; Zhou, X.; Liu, Z. Adv. Energy Mater. 2015, 5, 1400930.

Therefore what is claimed is:

1. A zinc ion battery, comprising:
a positive electrode compartment having enclosed therein an intercalation layered positive electrode material described by the formula $M_xV_2O_5 \cdot nH_2O$ when the positive electrode is in a fully charged state, wherein x is in a range from 0.05 to less than 1, n is in a range from greater than 0 to 2, wherein M is any one or combination of a d-block metal ion, f-block metal ion and alkaline earth ion, the metal M ion being in a +2 to +4 valence state, and wherein said $V_2O_5$ is a layered crystal structure having the metal ions M pillared between the layers, and waters of hydration coordinated to the metal ions M;
a negative electrode compartment having enclosed therein a negative electrode for storing zinc;
a separator electrically insulating and permeable to zinc ions separating the positive and negative compartments; and
an electrolyte comprising water and having a salt of zinc dissolved therein.

2. The zinc ion battery according to claim 1 wherein at least a portion of the waters of hydration are hydrogen bonded to the layers.

3. The zinc ion battery according to claim 1 wherein the negative electrode comprises zinc, and wherein the zinc ion battery is a zinc metal battery.

4. The zinc ion battery according to claim 1 wherein the electrolyte has a pH in a range from about 1 to about 8.

5. The zinc ion battery according to claim 1 wherein the intercalation layered positive electrode material has a particulate morphology being particles having a mean size in a range from about 5 nm to about 50 pm.

6. The zinc ion battery according to claim 5 wherein the particles are embedded in an electrically conducting matrix.

7. The zinc ion battery according to claim 6 wherein the electrically conducting matrix comprises any one or combination of carbon and conducting polymer, and including a binder.

8. The zinc ion battery according to claim 7 wherein the binder is any one or combination of styrene butadiene rubber (SBR), sodium carboxymethylcellulose (CMC), polyvinyl acetate (PVAc), polyacrylic acid (PAA), polyethylene glycol (PEG), polybutyl acrylate (PBA), polyurethane, acrylonitrile, polypyrrole, polyaniline, polytetrafluoroethylene (PTFE), polyvinylidene fluoride (PVDF), perfluorosulfonic acid (PFSA), and poly(3,4-ethylenedioxythiophene) (PEDOT).

9. The zinc ion battery according to claim 1 wherein the negative electrode comprises zinc metal or a zinc alloy in any form.

10. The zinc ion battery according to claim 1 wherein the negative electrode comprises a current collector, and a surface of the current collector facing into the negative electrode compartment having a layer of zinc bound thereto.

11. The zinc ion battery according to claim 10 wherein the current collector is comprised on any one or combination of carbon, boron, lead, vanadium, chromium, manganese, iron, cobalt, nickel, cadmium, tungsten, bismuth, tin, indium, antimony, copper, titanium, and zinc metal.

12. The zinc ion battery according to claim 1 wherein the negative electrode comprises a material that is configured to store elemental zinc by any one or combination of intercalation, conversion, and capacitive storage.

13. The zinc ion battery according to claim 1 wherein the electrolyte further comprises water dissolved zinc present in a range from about 0.01 to about 10 molar.

14. The zinc ion battery according to claim 13 wherein the salt of zinc comprises any one or combination of zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, and zinc bromide.

15. The zinc ion battery according to claim 1 wherein the electrolyte further comprises water dissolved zinc present in a range from about 0.1 to about 4 molar.

16. The zinc ion battery according to claim 15 wherein the salt of zinc comprises any one or combination of zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, and zinc bromide.

* * * * *

UNITED STATES PATENT AND TRADEMARK OFFICE
CERTIFICATE OF CORRECTION

PATENT NO. : 9,780,412 B2
APPLICATION NO. : 15/461849
DATED : October 3, 2017
INVENTOR(S) : Brian D. Adams and Dipan Kundu Page 1 of 1

It is certified that error appears in the above-identified patent and that said Letters Patent is hereby corrected as shown below:

On the Title Page

Item (72) Inventors should read:
Inventors: Brian D. Adams, Mitchell (CA); Dipan Kundu, Kitchener (CA); Linda F. Nazar, Waterloo (CA)

In the Specification

The following is to be inserted at Column 1, Line 5, before the heading "FIELD":
--GOVERNMENT RIGHTS
This invention was made with government support under Contract No. DEAR 952.227-11 awarded by the Department of Energy. The government has certain rights in the invention.--

Signed and Sealed this
Twenty-eighth Day of May, 2019

Andrei Iancu
*Director of the United States Patent and Trademark Office*